United States Patent [19]
August et al.

[11] Patent Number: 5,144,691
[45] Date of Patent: Sep. 1, 1992

[54] COMPUTER SIGNAL INTERCONNECT APPARATUS

[75] Inventors: Melvin C. August, Chippewa Falls; Daniel Massopust, Eau Claire; Mary Nebel, Chippewa Falls; Eugene F. Neumann, Chippewa Falls; Gregory W. Pautsch, Chippewa Falls, all of Wis.

[73] Assignee: Cray Research, Inc., Eagan, Minn.

[21] Appl. No.: 556,031

[22] Filed: Jul. 20, 1990

[51] Int. Cl.$^5$ .................................................. G02B 6/36
[52] U.S. Cl. ......................................... 385/88; 385/53
[58] Field of Search ..................... 350/96.15, 96.20; 385/73, 88, 53, 83, 85, 134

[56] References Cited

U.S. PATENT DOCUMENTS

| | | | |
|---|---|---|---|
| 4,130,343 | 12/1978 | Miller et al. | 350/96.15 |
| 4,422,088 | 12/1983 | Gfeller | 357/19 |
| 4,597,631 | 7/1986 | Flores | 350/96.20 |
| 4,943,136 | 7/1990 | Popoff | 350/96.15 |
| 4,969,924 | 11/1990 | Suverison et al. | 350/96.20 |

*Primary Examiner*—John D. Lee
*Assistant Examiner*—Phan T. Heartney
*Attorney, Agent, or Firm*—Merchant, Gould, Smith, Edell, Welter & Schmidt

[57] ABSTRACT

An optical backplane interconnects logic assemblies in a computer system using optical fibers. The logic assembly is connected to a laser or LED for converting electrical signals from the logic assembly into the equivalent optical signals. The optical signals are transmitted along the optical fibers to another logic assembly. The optical backplane comprises a mainframe rail for mounting to one end of the logic assembly, a connector attached to the mainframe rail, and an optical coupler mated with the connector. The optical coupler and connector having matching vee grooves for supporting and aligning the optical fibers.

3 Claims, 4 Drawing Sheets

COMPUTER SIGNAL INTERCONNECT APPARATUS

BACKGROUND OF THE INVENTION

1. Field of the Invention

This invention relates generally to methods of interconnecting printed circuit boards in computer systems. In particular, the present invention provides an optical backplane method and apparatus for computer systems.

2. Description of Related Art

As integrated circuits become more dense, often containing hundreds of I/O connections, the layout of printed circuit boards becomes more complex. Complex circuit boards often result in increased signal propagation delays, stray capacitance, and noise pickup on the electrical transmission lines. Thus, it is desirable to have a signal transfer arrangement which is not subject to the above disadvantages of electrical distortion by noise or stray fields, and which is suitable for densely packed integrated circuits and printed circuit boards. Optical transmission is a technology which addresses all the aforementioned issues.

Optical fiber as a transmission medium provides numerous advantages. The potential bandwidth is very high, approaching gigahertz capacity. Optical interconnections are also resistant to electromagnetic interference. Thus, an optical connector method provides a noise-free signal transmission environment.

SUMMARY OF THE INVENTION

To overcome the limitations in the prior art discussed above, and to overcome other limitations readily recognizable to those skilled in the art, this invention provides a new architecture for computer backplanes and interconnecting printed circuit boards in computer systems. The present invention provides an optical backplane that reduces noise, is resistant to electromagnetic interference, and supports high transmission rates.

The invention discloses an optical backplane for interconnecting logic assemblies with optical fibers. The logic assembly is connected to a laser or LED for converting electrical signals from the logic assembly into the equivalent optical signals. The optical signals are transmitted along the optical fibers. The optical backplane comprises a mainframe rail for mounting to one end of the logic assembly, a connector attached to the mainframe rail, and an optical coupler mated with the connector. The optical coupler and connector having matching vee grooves for supporting and aligning the optical fibers.

The optical fibers are laid in the vee grooves of the mated optical coupler and connector and bound thereto using an epoxy. The optical fiber is covered with a bonding material, which in turn, is covered with a flat utensil. The flat utensil is pressed downwards to secure the optical fiber and the bonding material. The face of the optical fiber is polished to a smooth surface.

The optical fibers secured in the vee grooves must be aligned with a laser and a photodetector. The optical fiber may be aligned with the laser in a conventional manner such that the light from the laser travels through the optical fiber. The optical fiber may be aligned with the photodetector such that the path of light through the optical fiber intersects the photodetector.

Alternatively, the optical fiber may be laid parallel with the photodetector such that a path of a light beam travelling through the optical fiber is parallel to a surface of the photodetector. An angular cut is made across the end of the optical fiber and a light-reflective layer is sputtered onto the end so that as the light beam travels down the optical fiber it reflects off the light-reflective layer into the photodetector. The optical fiber is secured to the photodetector using a optical mode matching gel and an epoxy. The optical mode matching gel ensures an optical continuity between the optical fiber and the photodetector.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

The invention discloses an optical backplane for interconnecting logic assemblies with optical fibers. Logic assemblies are interconnected by means of lasers or LEDs which convert electrical signals into the equivalent optical signals and transmit the optical signals along optical fibers. The optical backplane comprises a mainframe rail for mounting to one end of the logic assembly, a connector attached to the mainframe rail, and an optical coupler mated with the connector. The optical coupler and connector having matching vee grooves for supporting and aligning the optical fibers.

Figure 1:
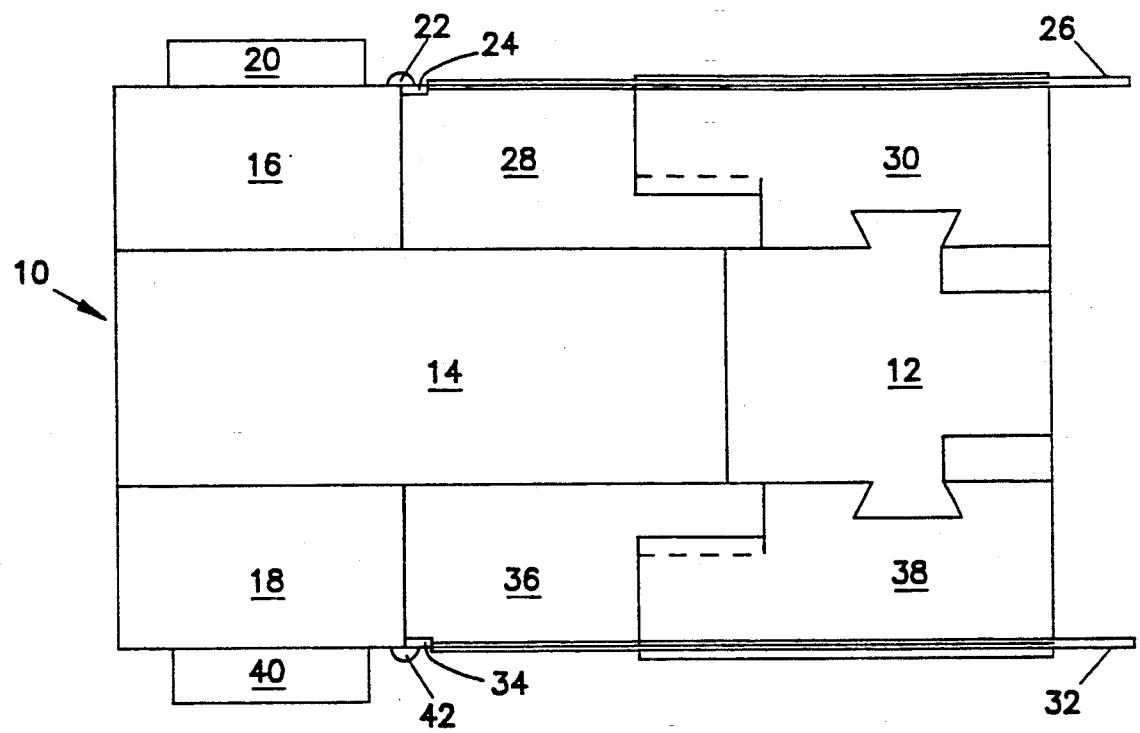
FIG. 1 is a cross-sectional view of the optical backplane assembly.

FIG. 1 is a cross-sectional view of the preferred embodiment of the invention. A mainframe rail 12 provides structural support for the entire apparatus. The mainframe rail 12 also supplies power to the apparatus. A logic assembly 10 is attached to the mainframe rail 12. The logic assembly 10 is comprised of a central Substrate Power Bus (SPB) 14, on both sides of which are mounted Low Density Interconnects (LDIs) 16 and 18 or printed circuit boards (PCBs) or similar substrates. Mounted on the LDIs are integrated circuits (not shown). Further information on the logic assembly 10 is disclosed in the co-pending and commonly assigned application Ser. No. 07/444,747 filed on Dec. 1, 1989 by L. T. Shepherd et al. entitled "HIGH POWER, HIGH DENSITY INTERCONNECT METHOD AND APPARATUS FOR INTEGRATED CIRCUITS", which application is hereby incorporated by reference.

At one edge of the PCB 16, a multiplexor 20 is used to combine electrical signals from the integrated circuits mounted on the PCB 16. The multiplexor 20 is connected to a laser or LED 24, for example, by means of a wire bond 22. In the preferred embodiment, eight wire bonds 22 connect the multiplexor 20 with eight lasers 24. The lasers 24 convert the electrical signals from the multiplexor 20 into the equivalent optical signals. The optical signals are transmitted down a plurality of optical fibers 26. In the preferred embodiment, there exists one optical fiber 26 for laser 24. An optical coupler 28 and connector 30 subassembly are used to support the optical fibers 26 leading from the lasers 24. Those skilled in the art will readily recognize that any combination of optical fibers, lasers, wire bonds, and multiplexors could be substituted for the configuration shown.

The optical signals are transmitted by the optical fibers 26 to another LDI, for example, LDI 18. For illustration purposes, the receiving end of the optical transmission is shown on the opposite side of the logic assembly 10. A plurality of optical fibers 32 lead to a plurality of photodetectors 34. There exists one photodetector 34 for each optical fiber 32. Thus, in the preferred embodiment, eight optical fibers 32 transmit optical signals that are transformed by eight detectors 34 into electrical signals. The electrical signals are transmitted by the detectors 34 to a de-multiplexor 40. The de-multiplexor 40 is connected to the detectors 34, for example, by means of wire bonds 42. An optical coupler 36 and connector 38 subassembly are used to support the optical fibers 32. Those skilled in the art will readily recognize that any combination of optical fibers, detectors, wire bonds, and de-multiplexors could be substituted for the configuration shown.

In the preferred embodiment, each logic assembly 10 could have lasers 24 on either side of the assembly 10, detectors 34 on either side of the assembly 10, or, as is shown here, lasers 24 on one side and detectors 34 on another.

Figure 2:
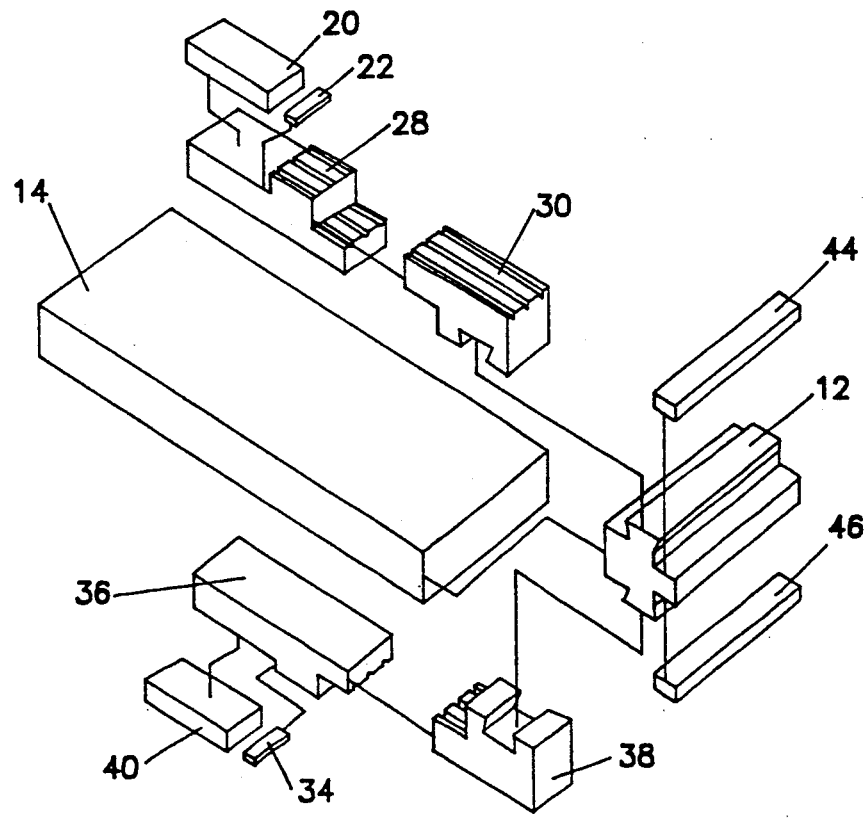
FIG. 2 is an exploded view of the optical backplane assembly.

FIG. 2 is an exploded view of the invention. The mainframe rail 12 mounts to one end of the SPB 14. A piece of compliant material 44 resides in a notch of the mainframe rail 12. The compliant material 44 provides some tolerance in the assembly of the optical backplane and thus helps maintain the alignment of the lasers 24 with the optical fibers 26. A connector 30 mates with the mainframe rail 12 with the compliant material 44 interposed therebetween. The connector 30 has a plurality of vee grooves along one surface for supporting and aligning the optical fibers 26. The connector 30 is notched to mate with an optical coupler 28. The optical coupler 28 has a series of vee grooves that match the vee grooves on the connector 30. The vee grooves on the optical coupler 28 support and align the optical fibers 26.

Similarly, on the opposite side of the logic assembly 10, a piece of compliant material 46 resides in a notch of the mainframe rail 12. The compliant material 46 provides some tolerance in the assembly of the optical backplane and thus helps maintain the alignment of the detectors 34 with the optical fibers 32. A connector 38 mates to the mainframe rail 12 with the compliant material 38 interposed therebetween. The connector 38 has a plurality of vee grooves along one surface for supporting and aligning the optical fibers 32. The connector 38 is notched to mate with an optical coupler 36. The optical coupler 36 has a series of vee grooves that match the vee grooves on the connector 38. The vee grooves on the optical coupler 36 supports and aligns the optical fibers 32.

Figure 3:
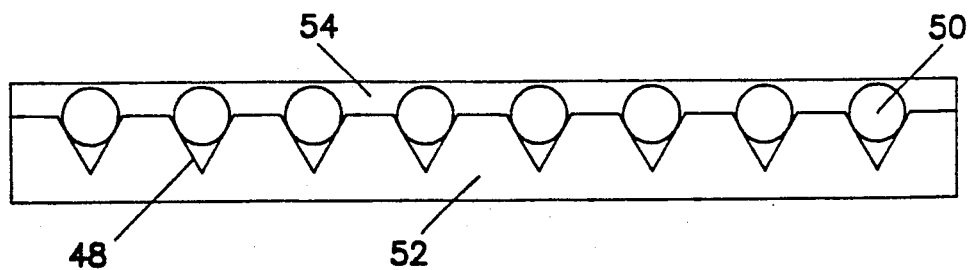
FIG. 3 is a cross-sectional view of the vee block.

FIG. 3 is a cross-sectional view describing the vee grooves 48. In the preferred embodiment, an optical fiber 50 is a multimode fiber with a 50 micron core. Each fiber 50 rests in a vee groove 48 and is bound thereto by an epoxy or other securing means. Additional bonding material 54 covers the fibers 50. The bonding material 54 is covered with a microscope cover glass, or other flat utensil, which is pressed downwards to secure the bonding material 54 and the fibers 50 to the vee grooves 48. The face of the optical fiber 50 is polished down to a smooth surface, preferably to within a tolerance of ±10 microns. This alignment process using the vee groups 48 is critical, because the optical fibers 50 must be centered on the laser to a tolerance of ±5 microns.

Figure 4:
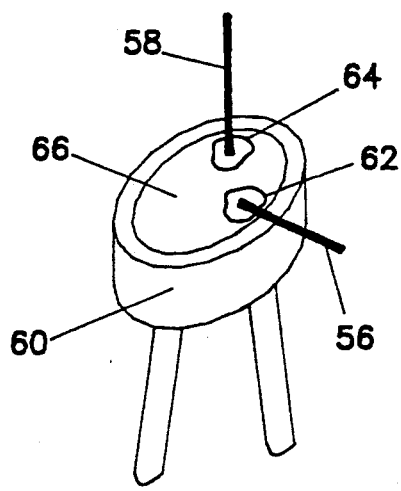
FIG. 4 describes two possible embodiments for attaching the optical fibers to the detector.

FIG. 4 shows two alternative methods for aligning optical fibers with a photodetector. In one method, a fiber 56 is laid flat on the detector 60, such that the path of the light through the fiber 56 is parallel to the surface of the detector 60. In a second method, the end of the fiber is placed flat against the detector 60, such that the path of the light through the fiber 58 intersects the surface of the detector 60. In both methods, the optical fibers 56 or 58 may be secured to the detector 60 by means of a mode matching gel 62 or 64 with an epoxy 66 thereon. The gel 62 or 64 may not be necessary if the path of the light through the fiber 58 intersects the surface of the detector 60. However, when the path of the light through the fiber 56 is parallel to the surface of the detector 60, the optical mode matching gel 62 "bends" the light to intersect the surface of the detector 60 and thus ensures optical continuity between the fiber 56 and the detector 60.

Figure 5:
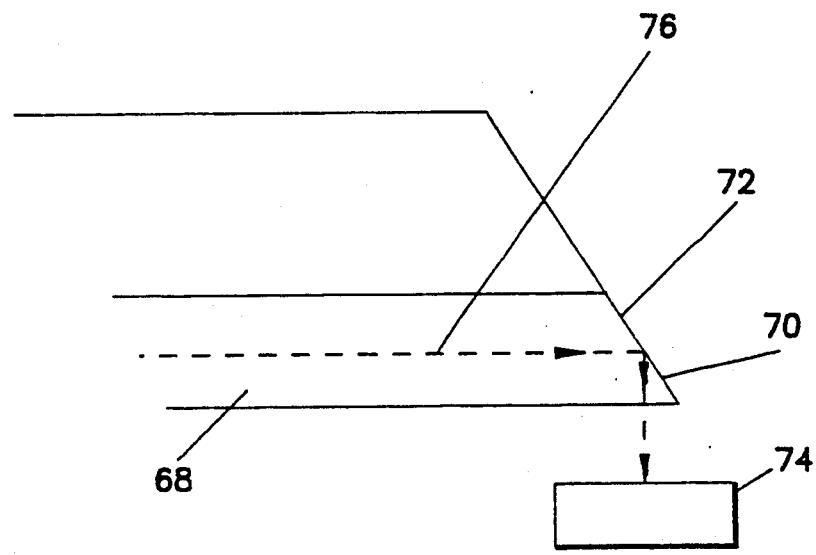
FIG. 5 is a cross-sectional view of the alignment of the detector and the vee block.

Another, more preferable embodiment is illustrated in FIG. 5. A fiber 68 is laid flat on the detector 74, such that the path of the light through the fiber 68 is parallel to the surface of the detector 74. A 45 degree cut 70 is made across the end of the fiber 68. The cut 70 is sputtered with a gold layer 72 to make a reflective surface. As light 76 travels down the fiber 68, it reflects off the sputtered gold surface 72 into the detector 74.

This concludes the description of the preferred embodiment of the invention. The following paragraphs describe some alternative methods of accomplishing the same invention.

Figure 6:
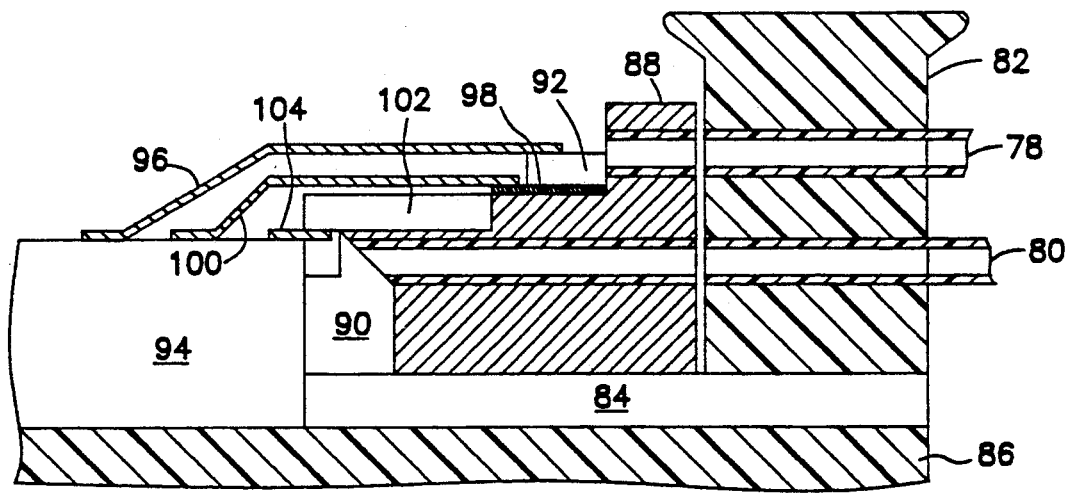
FIG. 6 is a second alternative embodiment of the optical backplane.

FIG. 6 is a second alternative embodiment of the optical backplane. A connector block 82 rests on a vee block 84, which in turn, is supported by a substrate or PCB 86. A transmitting fiber 78 and a receiving fiber 80 extend through the connector block 82 and a first part 88 of a two-part bevel block 88 and 90. The transmitting fiber 78 is aligned with a laser 92. The laser 92 is connected to a multiplexor/demultiplexor 94 by means of a TAB tape 96, or a conductor 98 and TAB tape 100. The receiving fiber 80 is laid parallel with a photodetector 102. A 45 degree cut is made across the end of the fiber 80. The cut is sputtered with a gold layer to make a reflective surface. As light travels down the fiber 80, it reflects off the sputtered gold surface into the detector 102. The detector 102 is connected to the multiplexor/demultiplexor 94 by means of a TAB tape 104. The second part 90 of the two-part bevel block 88 and 90 provides additional support for the detector 102 and the receiving fiber 80.

Figure 7:
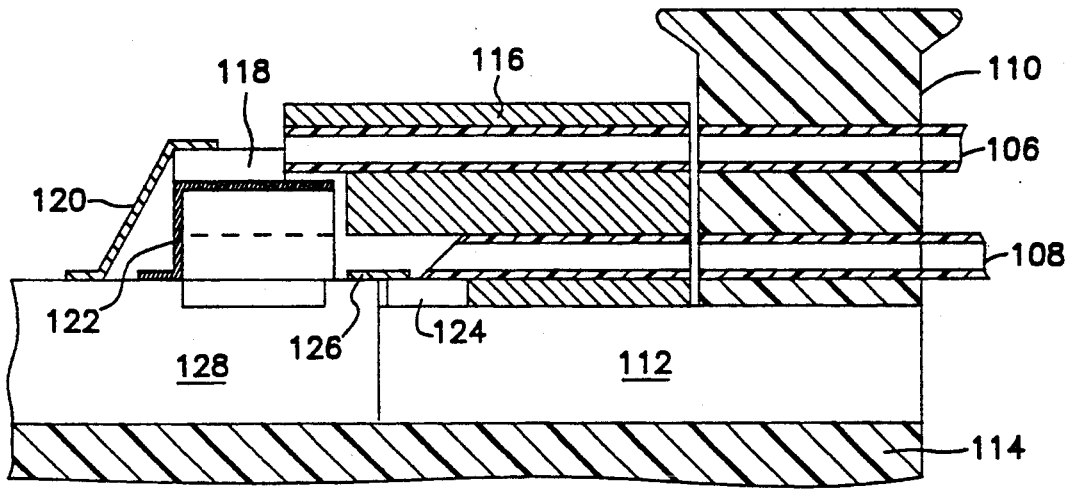
FIG. 7 is a third alternative embodiment of the optical backplane.

FIG. 7 is a third alternative embodiment of the optical backplane. A connector 110 is supported by a vee block 112, which in turn, is supported by a substrate or PCB 114. The vee block 112 lies adjacent a multiplexor/de-multiplexor 128. A transmitting fiber 106 and a receiving fiber 108 extend through the connector 110 and a block 116. The transmitting fiber 106 is aligned with a laser 118. The laser 118 is connected to the multiplexor/demultiplexor 128 by means of a TAB tape 120. The laser 118 is also connected to the multiplexor/demultiplexor 128 by means of a conductor 122. The receiving fiber 108 is aligned with a photodetector 124. A 45 degree cut is made across the end of the fiber 108. The cut is sputtered with a gold layer to make a reflective surface. As light travels down the fiber 108, it reflects off the sputtered gold surface into the detector 124. The detector 124 is connected to the multiplexor/de-multiplexor 128 by means of a TAB tape 126.

Figure 8:
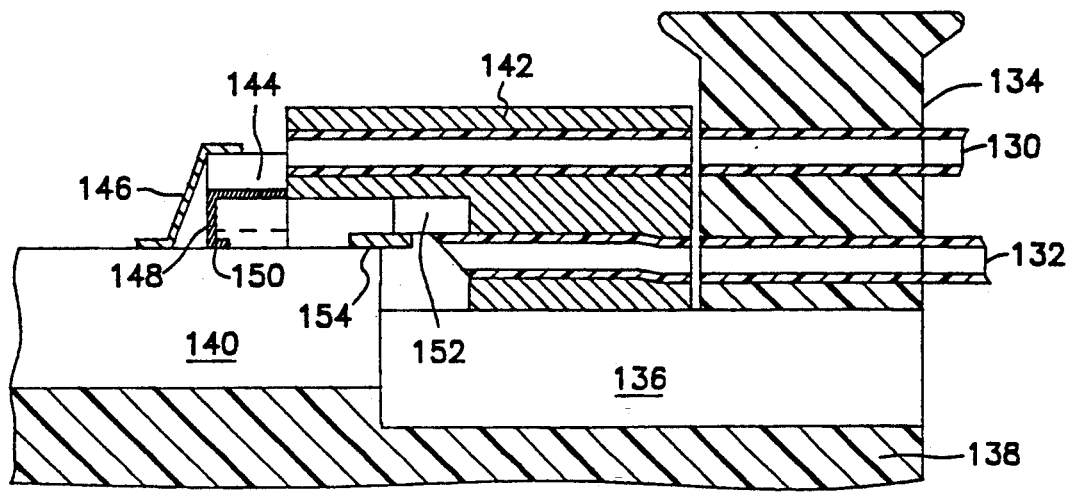
FIG. 8 is a fourth alternative embodiment of the optical backplane.

FIG. 8 is a fourth alternative embodiment of the optical backplane. A connector 134 resides on top of a vee block 136, which in turn, is mounted on a PCB or substrate 138. The vee block 136 is mounted adjacent a multiplexor/demultiplexor 140. A transmitting fiber 130 and a receiving fiber 132 extend through a connector 134 and a block 142. The transmitting fiber 130 is aligned with a laser 144. The laser 144 is connected to a multiplexor/demultiplexor 140 by means of a TAB tape 146. The laser 144 is also supported by a multiplexor 140. The laser 144 is also connected to the multiplexor 140 by means of a conductor 148 and a solder plate 150. The receiving fiber 132 is aligned with a photodetector 152. A 45 degree cut is made across the end of the fiber 152. The cut is sputtered with a gold layer to make a reflective surface. As light travels down the fiber 132, it reflects off the sputtered gold surface into the detector 152. The detector 152 is connected to the multiplexor/de-multiplexor 140 by means of a TAB tape 154.

Figure 9:
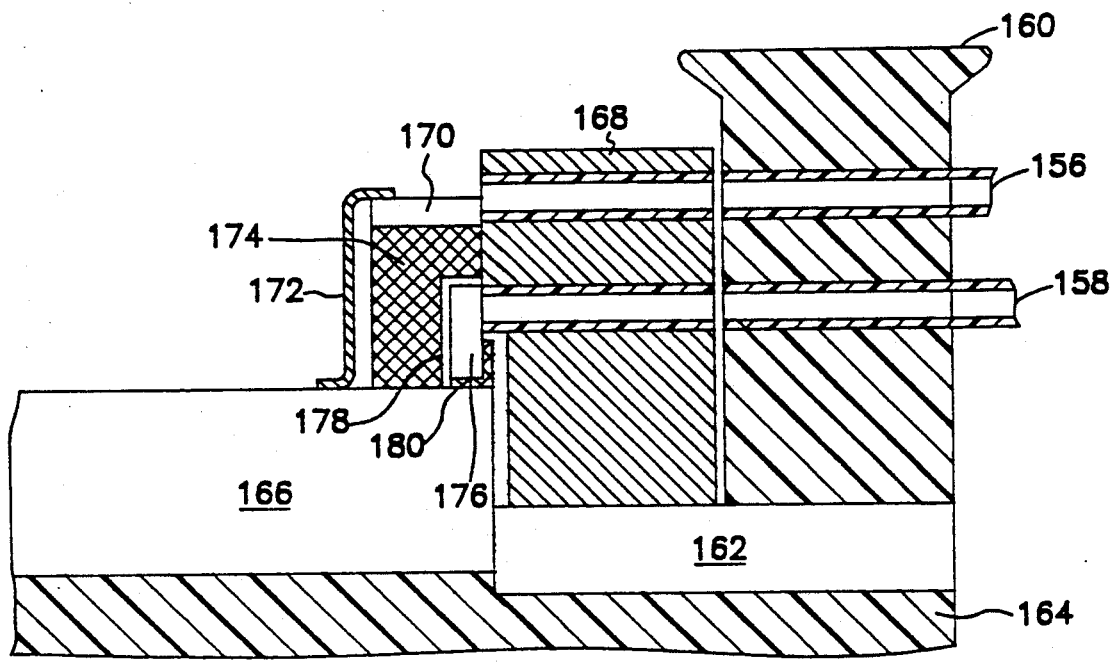
FIG. 9 is a fifth alternative embodiment of the optical backplane.

FIG. 9 is a fifth alternative embodiment of the optical backplane. A connector 160 resides on top of a vee block 162, which in turn, is supported by a PCB or substrate 164. The vee block 162 lies adjacent a multiplexor/de-multiplexor 166. A transmitting fiber 156 and a receiving fiber 158 extend through the connector 160 and a block 168. The transmitting fiber 156 is aligned with a laser 170. The laser 170 is connected to the multiplexor/demultiplexor 166 by means of a TAB tape 172. The laser 170 is supported by a solder plate 174. The receiving fiber 158 terminates at a photodetector 176. The detector 176 is connected to the demultiplexor 166 by means of solder plates 178 and 180.

Figure 10:
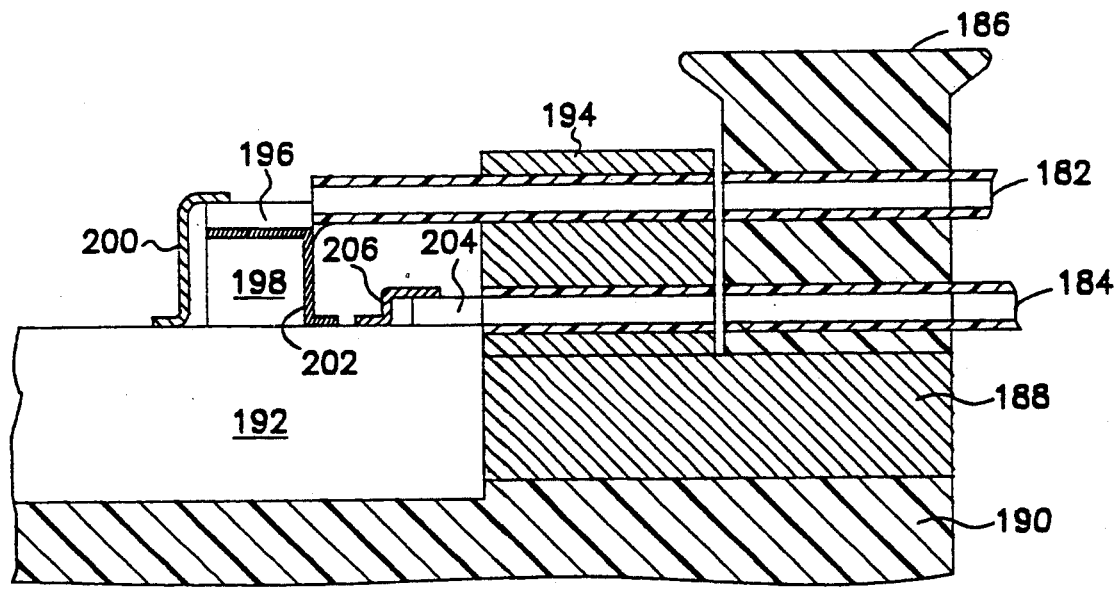
FIG. 10 is a sixth alternative embodiment of the optical backplane.

FIG. 10 is a sixth alternative embodiment of the optical backplane. A connector 186 is supported by a block 188, which in turn, is supported by a PCB or substrate 190. The block 188 lies adjacent to a multiplexor/de-multiplexor 192. A transmitting fiber 182 and a receiving fiber 184 extend through the connector 186 and a block 194. The transmitting fiber 182 is aligned with a laser 196. The laser 196 is supported by a block 198. The laser 196 is electrically connected to the multiplexor 192 by means of a TAB tape 200 and a solder plate 202. The receiving fiber 184 is aligned with a photodetector 204. The detector 20 is supported by the de-multiplexor 192.

The detector 204 is connected to the de-multiplexor 192 by means of a TAB tape 206.

The foregoing description of the preferred and alternative embodiments of the invention have been presented for the purposes of illustration and description. They are not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. An optical backplane for interconnecting logic assemblies with at least one optical fiber, the logic assembly connected to a laser for converting at least one electrical signal from the logic assembly into an equivalent optical signal, the optical signal being transmitted along the optical fiber, the backplane comprising:
   (a) a mainframe rail for mounting to one end of the logic assembly;
   (b) a connector mated with the mainframe rail;
   (c) an optical coupler mated with the connector;
   (d) the optical coupler and connector having at least one matching V-groove along a first surface for supporting and aligning the optical fibers; and
   (e) pressure means for supporting the connection between the optical coupler and the connector, and the connection between the laser and the optical fiber.

2. A method of supporting and aligning optical fibers in an optical backplane system, the backplane comprised of a mainframe rail for mounting to one end of the logic assembly, a connector attached to the mainframe rail, an optical coupler mated with the connector, the optical coupler and connector having matching V-grooves for supporting and aligning the optical fibers, the method comprising:
   (1) laying an optical fiber in the V-groove of the mated optical coupler and connector;
   (2) binding the optical fiber to the V-groove using an epoxy;
   (3) covering the optical fiber with a bonding material;
   (4) covering the bonding material with a flat utensil;
   (5) pressing downwards on the flat utensil to fuse the bonding material;
   (6) polishing a face of the optical fiber to a smooth surface; and
   (7) engaging a pressure means for supporting the connection between the optical coupler and the connector.

3. An optical backplane for interconnecting logic assemblies with at least one optical fiber, the logic assembly connected to a detector for converting at least one optical signal from the optical fiber into an equivalent electrical signal for use in the logic assembly, the optical signals being transmitted along the optical fiber, the backplane comprising:
   (a) a mainframe rail for mounting to one end of the logic assembly;
   (b) a connector mated with the mainframe rail;
   (c) an optical coupler mated with the connector;
   (d) the optical coupler and connector having at least one matching V-groove along a first surface for supporting and aligning the optical fibers; and
   (e) pressure means for supporting the connection between the optical coupler and the connector, and the detector with the optical fiber.

* * * * *

UNITED STATES PATENT AND TRADEMARK OFFICE
CERTIFICATE OF CORRECTION

PATENT NO. : 5,144,691                            Page 1 of 3

DATED : September 1, 1992

INVENTOR(S) : Melvin C. August et al.

It is certified that error appears in the above-identified patent and that said Letters Patent is hereby corrected as shown below:

On the title page:

Item: # 73, Assignee, "Eagan" should read --Minneapolis--.

Column 3, lines 7, 9, 12, 14 and 22, "multiplexor" should read --multiplexer--.

Column 3, lines 34, 35 and 40, "de-multiplexor" should read --demultiplexer--.

Column 4, line 62, "multiplexor/demultiplexor" should read --multiplexer/demultiplexer--.

Column 5, lines 1 and 2, "multiplexor/demultiplexor" should read --multiplexer/demultiplexer--.

Column 5, lines 9 and 10, "multiplexor/de-multiplexor" should read --multiplexer/demultiplexer--.

Column 5, lines 13, 14, 15 and 16, "multiplexor/demultiplexor" should read --multiplexer/demultiplexer--.

Column 5, lines 22 and 23, "multiplexor/de-multiplexor" should read --multiplexer/demultiplexer--.

UNITED STATES PATENT AND TRADEMARK OFFICE
CERTIFICATE OF CORRECTION

PATENT NO. : 5,144,691

DATED : September 1, 1992

INVENTOR(S) : Melvin C. August et al.

It is certified that error appears in the above-identified patent and that said Letters Patent is hereby corrected as shown below:

Column 5, line 28, "multiplexor/demultiplexor" should read --multiplexer/demultiplexer--.

Column 5, line 29, "132" should read --132'--.

Column 5, line 32, "multiplexor/demultiplexor" should read --multiplexer/demultiplexer--.

Column 5, lines 34 and 35, "multiplexor" should read --multiplexer--.

Column 5, lines 42, 43, 47 and 48, "multiplexor/de-multiplexor" should read --multiplexer/demultiplexer--.

Column 5, lines 51 and 52, "multiplexor/demultiplexor" should read --multiplexer/demultiplexer--.

Column 5, line 55, "demultiplexor" should read --demultiplexer--.

Column 5, lines 60 and 61, "multiplexor/de-multiplexor" should read --multiplexer/demultiplexer--.

Column 5, line 65, "multiplexor" should read --multiplexer--.

Column 5, line 68, "de-multiplexor" should read "demultiplexer--.

UNITED STATES PATENT AND TRADEMARK OFFICE
CERTIFICATE OF CORRECTION

PATENT NO.    :    5,144,691
DATED         :    September 1, 1992
INVENTOR(S)   :    Melvin C. August, et al.

It is certified that error appears in the above-identified patent and that said Letters Patent is hereby corrected as shown below:

Column 6, line 1, "de-multiplexor" should read --demultiplexer--.

Column 6, claim 1, line 17, "signal" (2nd occurrence) should read --signals--.

Signed and Sealed this

Thirtieth Day of November, 1993

Attest:

BRUCE LEHMAN

Attesting Officer

Commissioner of Patents and Trademarks